July 12, 1966   F. M. POTTER   3,260,872
OIL COOLED GENERATOR DESIGN
Filed April 13, 1964
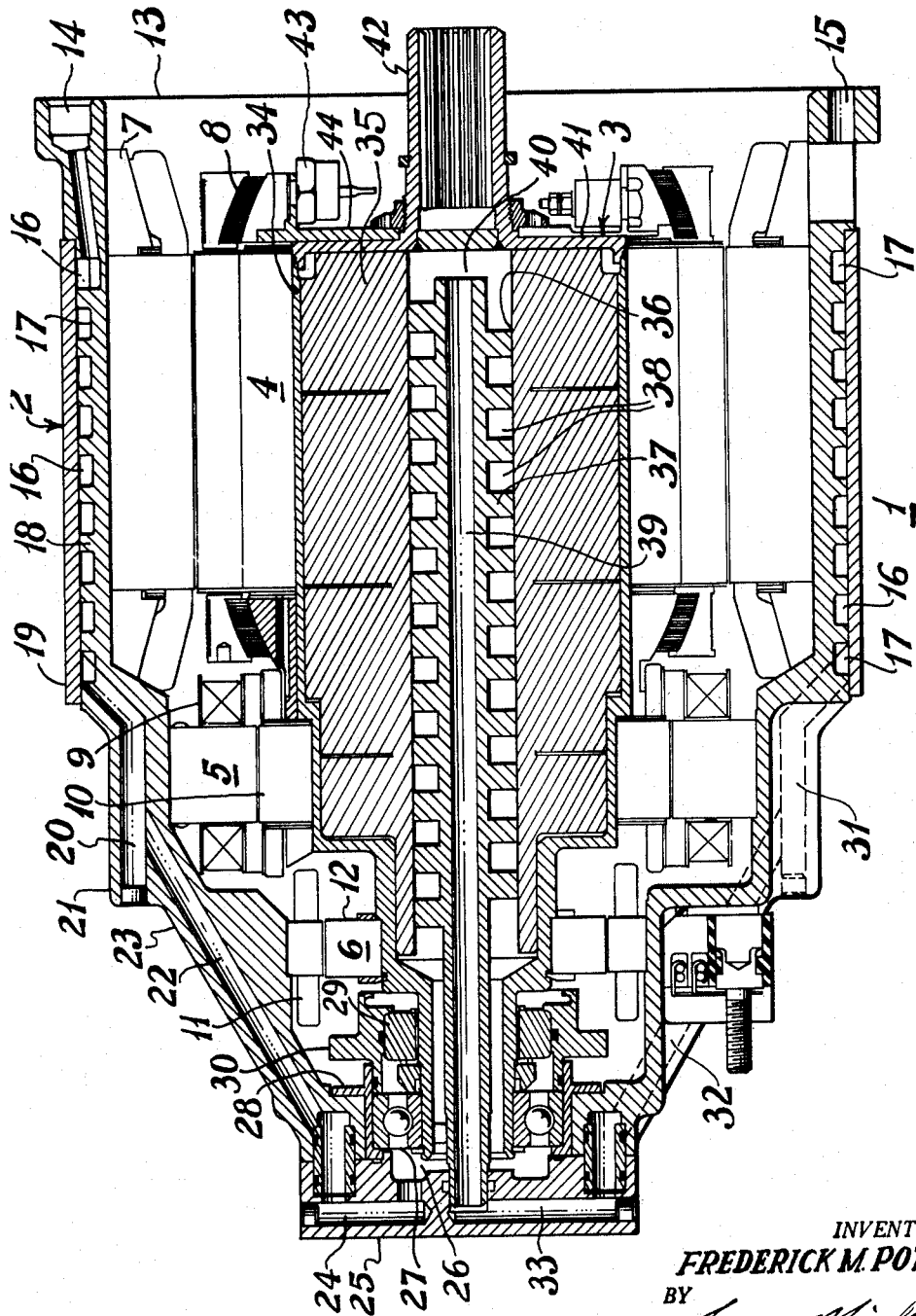
INVENTOR.
FREDERICK M. POTTER
BY
*James M. Michels*
ATTORNEY

United States Patent Office 3,260,872
Patented July 12, 1966

3,260,872
OIL COOLED GENERATOR DESIGN
Frederick Milton Potter, Little Silver, N.J., assignor to The Bendix Corporation, Eatontown, N.J., a corporation of Delaware
Filed Apr. 13, 1964, Ser. No. 359,049
7 Claims. (Cl. 310—54)

The present invention relates to dynamoelectric machines and more particularly to a liquid cooled machine.

With the increased speed and altitudes under which aircraft operate, serious problems have arisen in providing adequate cooling for the aircraft generators. Further lubrication of the bearings also present a problem. Heretofore air was used as the cooling medium. At the present supersonic speeds, the air available for cooling is, because of the heat generated by adiabatic compression, often higher than the allowable temperature for the generator. Also at extreme altitudes, the density of the air is not sufficient to provide a sufficient amount of air for cooling.

The present invention provides a fluid cooled machine in which the cooling fluid not only cools the machine but also lubricates the bearing.

It is an object of the invention to provide an improved dynamoelectric machine.

Another object of the invention is to provide an improved fluid cooled dynamoelectric machine.

Another object of the invention is to provide an improved method of lubricating the bearing of a dynamoelectric machine.

A further object of the invention is to provide a novel oil cooled generator.

The above and other objects and features of the invention will appear more fully hereinafter from a consideration of the following description taken in connection with the accompanying drawing wherein one embodiment is illustrated by way of example.

In the drawing:

The single figure is a cutaway view of a dynamoelectric machine embodying the invention.

Referring now to the drawing, a dynamoelectric machine is indicated generally by the numeral 1 and as an example is a generator. The generator 1 has a housing 2 and rotor 3 and for the purpose of illustration is shown as a brushless type having a main generator 4, and exciter 5 and a PM generator 6. The generator 4 has a stator winding 7 secured in the housing 2 in a suitable manner and a cooperating rotor winding 8 on the rotor 3. In like manner, the exciter 5 has a stator winding 9 secured in the housing 2 and a rotor winding 10 on the rotor 3. The PM generator 6 has a winding 11 secured in the housing 3 and a permanent magnet rotor 12 mounted on the rotor 3.

The housing 2 includes a mounting flange 13 adapted for attaching the generator 1 to a prime mover (not shown). The flange 13 has a pair of diametrically opposite channels 14 and 15 (not shown) which are adapted for connection to an oil supply such as from a constant speed drive. The channels 14 and 15 connect to parallel spiral grooves 16 and 17, respectively, around the circumference of a section 18 of the housing 2. A cylindrical member 19 surrounds the section 18 and coacts with the section 18 to make the spiral grooves 16 and 17 into oil tight channels.

The other end of the spiral groove 16 connects with a channel 20 in a flange section 21 of the housing 2. The channel 20 extends to and connects to one end of a channel 22 in flanged end section 23 of the housing 2. The other end of the channel 22 connects to a channel 24 in bearing cap 25. The channel 24 connects to a bearing chamber 26 in which a bearing 27 is mounted by bearing retainer 28 for supporting the rotor 3 in the housing 2. An oil seal 29 is positioned between the rotor 3 and housing 2 by a clamping member 30. The other end of the grooves 17 connect to a channel 31, in the section 21 of the housing 2, which connects to a channel 32 in the end section 23. The channel 32 connects to a channel 33 in the bearing cap 25.

The rotor 3 includes an outer shaft 34 upon which the rotor windings 8, 10 and the permanent magnet 12 are mounted. Within the rotor shaft 34 is a shaft section 35 which has an axial opening 36 extending therethrough. Fitted in the opening 36 of the shaft section 35 is an inner shaft member 37 having spiral grooves 38 extending around the circumference thereof and an axial opening 39 extending therethrough. The opening or channel 39 connects with the channel 33 of the bearing cap 25 and extends to a chamber 40 at the opposite end thereof. The chamber 40 connects with the spiral grooves 38 which connect with the bearing chamber 26. An end section 41 of the rotor 3 has a portion 42 adapted for connection to a prime mover (not shown). Rotating rectifiers 43 are mounted on an aluminum plate or heatsink 44 which is in intimate contact with the end section 41 of the rotor 3.

In operation, for example, cooling oil enters from a hydraulic constant speed drive through the channel 15 in the mounting flange 13 to the spiral grooves 17 passing around the circumference of the section 18. From the grooves 17, the oil flows through channels 31 and 32 to channel 33 in the bearing cap 25. From the channel 33, the oil passes through the spiral grooves 38 to the bearing chamber 26. As the oil passes through the chamber 26, it lubricates the bearing 27. From the chamber 26, the oil passes into the channel 24 in the bearing cap 25 and from there through the channels 22 and 20 to the spiral grooves 16. From the spiral grooves 16, the oil flows through the channel 14 back to the hydraulic drive.

The section 25 of the rotor 3 is of a material, such, for example, as aluminum which has good heat transfer characteristics to conduct the heat from the rotor windings to be cooled by the oil flowing through the grooves 38. Further, due to the weight thereof, aluminum affords an advantage over heavier materials in addition to the heat transfer characteristics.

The design of the generator 1 is such as to minimize the concentration of heat. By the selection of aluminum for the housing and spiral groove construction, the amount of area for heat transfer into the cooling oil is very large. Also by the use of aluminum in the rotor the area for heat transfer is such that hot spots are eliminated.

The spiral grooves 16 and 17 in the housing and also the spiral groove 38 in the rotor are of a precise shape and size so as to obtain turbulent flow of the oil. Turbulent flow provides the best heat transfer between the housing, rotor and the oil. In the rotor 3, the pitch line of the spiral groove 38 is limited to the bore of the shaft under the bearing 27 so as to minimize back pressure due to rotation of the rotor 3. Further, by the oil entering at the center of the rotor shaft, back pressure is minimized. Acually it provides a pumping action to assist the flow of the oil.

While oil has been described as the cooling fluid, it is understood that any suitable cooling medium could be used. Also the direction of flow through the machine could be reversed.

Although only one embodiment of the invention has been illustrated and described, various changes in the form and relative arrangement of the parts, which will now appear to those skilled in the art, may be made without departing from the scope of the invention.

What is claimed is:
1. A dynamoelectric machine comprising a stator and a rotor, means for circulating a liquid coolant in a closed circuit in heat transfer relation with said stator and rotor, said means comprising two groups of parallel spiral grooves surrounding said stator, an input channel connecting one end of one group of said parallel spiral grooves, a longitudinally extending channel in said rotor, a first connecting channel connecting the other end of said one group of parallel grooves to one end of said longitudinally extending channel, a spiral channel in said rotor, a reservoir connecting the other end of said longitudinally extending channel to one of said spiral channel in said rotor, a second connecting channel connecting the other end of said rotor spiral channel to one end of the other of said groups of parallel grooves, and an output channel connected to the other end of said other groups of parallel grooves.

2. The combination as set forth in claim 1 and including rectifiers mounted on said rotor adjacent to said reservoir.

3. A liquid cooled generator comprising a housing, a rotor, bearing means mounting said rotor in said housing, stator windings secured in said housing, a pair of parallel spiral grooves around the outer circumference of said housing, a cover for said grooves to form closed channels, an inlet connected to one end of one of said pair of spiral grooves, an outlet connected to one end of said other one of said pair of spiral grooves, said rotor having an outer shaft and an inner shaft, said inner shaft having an opening extending longitudinally therein, first channel means connecting said the other end of said one of said parallel spiral grooves to said opening in said shaft, a spiral groove around the outer circumference of said inner shaft, a heat exchange member positioned between said inner and outer shafts, reservoir means connecting said opening in said shaft to one end of said spiral groove, means including a bearing chamber connecting the other end of said spiral groove to the other end of said other parallel spiral grooves.

4. The combination as set forth in claim 3 in which said heat exchange member is aluminum.

5. The combination as set forth in claim 3 and including a bearing in said bearing chamber supporting said rotor in said housing.

6. The combination as set forth in claim 3 in which the pitch of said spiral groove is less than the inner diameter of said outer shaft at the point where said bearing is positioned.

7. A liquid cooled generator comprising a housing, a rotor mounted in said housing, a mounting flange on said housing, a pair of parallel spiral channels around said housing, a spiral channel in said rotor, means connecting said parallel spiral channels to said spiral channel in said rotor to circulate a cooling fluid therein, and inlet and outlet means in said mounting flange connecting said parallel spiral channels.

References Cited by the Examiner

UNITED STATES PATENTS

| | | | |
|---|---|---|---|
| 1,830,457 | 11/1931 | Apple | 310—54 |
| 2,192,654 | 3/1940 | Simons | 310—54 |
| 2,894,155 | 7/1959 | Lebastie | 310—54 |
| 3,060,335 | 10/1962 | Greenwald | 310—54 |
| 3,184,624 | 5/1965 | Solomon | 310—54 |

MILTON O. HIRSHFIELD, *Primary Examiner.*

ORIS L. RADER, *Examiner.*

L. L. SMITH, *Assistant Examiner.*